(12) United States Patent
Bandi et al.

(10) Patent No.: US 11,940,544 B2
(45) Date of Patent: Mar. 26, 2024

(54) VEHICLE POSITIONING USING V2X RSU MESSAGING AND VEHICULAR SENSORS

(71) Applicant: FORD GLOBAL TECHNOLOGIES, LLC, Dearborn, MI (US)

(72) Inventors: Krishna Bandi, Farmington Hills, MI (US); Samer Ibrahim, Dearborn, MI (US); Brennan Hamilton, Birmingham, MI (US); Sathyanarayana Chary Palakonda, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 99 days.

(21) Appl. No.: 17/509,780

(22) Filed: Oct. 25, 2021

(65) Prior Publication Data

US 2023/0131434 A1 Apr. 27, 2023

(51) Int. Cl.
| | |
|---|---|
| *G01S 19/45* | (2010.01) |
| *G01S 17/931* | (2020.01) |
| *G08G 1/01* | (2006.01) |
| *G08G 1/056* | (2006.01) |
| *H04W 4/40* | (2018.01) |

(52) U.S. Cl.
CPC ............ *G01S 19/45* (2013.01); *G01S 17/931* (2020.01); *G08G 1/0116* (2013.01); *G08G 1/0129* (2013.01); *G08G 1/056* (2013.01); *H04W 4/40* (2018.02)

(58) Field of Classification Search
CPC ........ G01S 19/45; G01S 17/931; H04W 4/40; G08G 1/0116; G08G 1/0129; G08G 1/056

USPC ......................................................... 340/935
See application file for complete search history.

(56) References Cited

U.S. PATENT DOCUMENTS

| | | | |
|---|---|---|---|
| 10,969,498 B2 | 4/2021 | Tao et al. | |
| 10,982,962 B2 | 4/2021 | Mishra | |
| 2008/0262728 A1* | 10/2008 | Lokshin | G01C 21/165 |
| | | | 701/472 |
| 2015/0170310 A1* | 6/2015 | Amento | G06Q 20/145 |
| | | | 705/13 |
| 2016/0061612 A1* | 3/2016 | You | G01C 21/28 |
| | | | 701/409 |
| 2017/0344855 A1* | 11/2017 | Mande | G06V 20/58 |
| 2018/0018877 A1* | 1/2018 | Townsend | G08G 1/096783 |
| 2018/0245938 A1* | 8/2018 | Song | G08G 1/096822 |
| 2018/0252540 A1* | 9/2018 | Lim | G01C 21/3484 |

(Continued)

OTHER PUBLICATIONS

Khattab et al., High Accuracy GPS-Free Vehicle Localization Framework via an INS-Assisted Single RSU, International Journal of Distributed Sensor Networks, vol. 2015, Article ID 795036, Apr. 2015.

*Primary Examiner* — Kerri L McNally
*Assistant Examiner* — Thang D Tran
(74) *Attorney, Agent, or Firm* — Joseph Zane; Brooks Kushman P.C.

(57) ABSTRACT

Position enhancement for vehicle positioning is provided. Vehicle-to-everything (V2X) messages are received from a roadside unit (RSU) to an onboard unit (OBU) of a vehicle via a transceiver of the vehicle, the V2X messages indicating a location of the RSU. Image sensors of the vehicle are utilized to capture sensor data of the RSU. A current position of the vehicle is updated to a corrected current position of the vehicle based the RSU as shown in the sensor data and the location of the RSU indicated in the V2X messages.

18 Claims, 9 Drawing Sheets

(56) References Cited

U.S. PATENT DOCUMENTS

| | | | |
|---|---|---|---|
| 2019/0116561 A1* | 4/2019 | Noda | H04W 52/245 |
| 2019/0302275 A1* | 10/2019 | Tao | G08G 1/0116 |
| 2020/0077238 A1* | 3/2020 | Alexander | H04W 4/40 |
| 2020/0084738 A1* | 3/2020 | Nguyen | H04W 64/003 |
| 2020/0088528 A1* | 3/2020 | Mishra | H04W 4/021 |
| 2020/0100048 A1* | 3/2020 | Wu | H04W 28/0268 |
| 2020/0310437 A1* | 10/2020 | Kumar | G01C 21/3453 |
| 2020/0342760 A1* | 10/2020 | Vassilovski | H04W 4/06 |
| 2020/0370890 A1 | 11/2020 | Hamilton et al. | |
| 2021/0005085 A1* | 1/2021 | Cheng | G08G 1/0141 |
| 2021/0096215 A1* | 4/2021 | Slobodyanyuk | H04W 4/38 |
| 2021/0103743 A1* | 4/2021 | Park | G06V 10/811 |
| 2021/0158701 A1* | 5/2021 | Cho | G08G 1/096716 |
| 2021/0231461 A1* | 7/2021 | Wang | G08G 1/096783 |
| 2021/0304612 A1* | 9/2021 | Weinfield | G08G 1/162 |
| 2021/0306979 A1* | 9/2021 | Choi | H04L 5/0051 |
| 2021/0350146 A1* | 11/2021 | Zhang | G06T 7/215 |
| 2021/0360571 A1* | 11/2021 | Hwang | H04W 64/00 |
| 2021/0407291 A1* | 12/2021 | Xia | G08G 1/0116 |
| 2022/0058943 A1* | 2/2022 | Jeong | G01S 5/14 |
| 2022/0070883 A1* | 3/2022 | Choi | H04B 7/0695 |
| 2022/0073108 A1* | 3/2022 | Park | G01S 19/43 |
| 2022/0107382 A1* | 4/2022 | Hwang | H04W 64/00 |
| 2022/0110042 A1* | 4/2022 | Park | H04W 36/00837 |
| 2022/0159428 A1* | 5/2022 | Choi | G01S 1/0428 |
| 2022/0317312 A1* | 10/2022 | Sharma | G01S 19/05 |
| 2023/0066476 A1* | 3/2023 | Ludwig | G01C 21/3626 |
| 2023/0121104 A1* | 4/2023 | Wu | G01S 5/02955 |
| | | | 455/456.6 |

* cited by examiner

VEHICLE POSITIONING USING V2X RSU MESSAGING AND VEHICULAR SENSORS

TECHNICAL FIELD

Aspects of the disclosure generally relate to improved vehicle global navigation satellite system (GNSS) positioning, using vehicle-to-everything (V2X) roadside unit (RSU) communications and vehicular sensors.

BACKGROUND

Vehicle-to-everything (V2X) is a type of communication that allows vehicles to communicate with various aspects of the traffic environment. This communication may include interaction with vehicles using vehicle-to-vehicle (V2V) communication and interaction with infrastructure using vehicle-to-infrastructure (V2I) communication.

Vehicles may include radio transceivers and vehicle onboard units (OBUs) to facilitate the V2X communication. Road-side units (RSUs) may provide wireless communications from roadside infrastructure to the OBUs. Such communication may be referred to as infrastructure-to-vehicle (I2V) communication. RSUs generally operate in the same frequency band as V2X, over technologies such as Cellular Vehicle-to-Everything (CV2X) and Dedicated Short Range Communications (DSRC) technologies. Some RSUs provide additional functionality, such as local Wi-Fi hotspots for pedestrians or cellular backhaul to communicate information with a central system.

SUMMARY

In one or more illustrative examples, a vehicle for performing vehicle positioning is provided. The vehicle includes a transceiver, image sensors, and an onboard unit (OBU). The OBU is programmed perform a position enhancement including to receive, via the transceiver, vehicle-to-everything (V2X) messages from a roadside unit (RSU), the V2X messages indicating a location of the RSU, utilize the sensors to capture sensor data of the RSU, and update a current position of the vehicle to a corrected current position of the vehicle based the RSU as shown in the sensor data and the location of the RSU indicated in the V2X messages.

In one or more illustrative examples, a method for performing vehicle heading analysis and position enhancement for vehicle positioning for vehicle positioning is provided. Vehicle-to-everything (V2X) messages are received from a roadside unit (RSU) to an onboard unit (OBU) of a vehicle via a transceiver of the vehicle, the V2X messages indicating a location of the RSU. Image sensors of the vehicle are utilized to capture sensor data of the RSU. A current position of the vehicle is updated to a corrected current position of the vehicle based the RSU as shown in the sensor data and the location of the RSU indicated in the V2X messages.

In one or more illustrative examples, a non-transitory computer-readable medium comprising instructions for performing position enhancement for vehicle positioning, that, when executed by a processor of an onboard unit (OBU) of a vehicle cause the OBU to perform operations including to receive, to the OBU via a transceiver of the vehicle, vehicle-to-everything (V2X) messages from a roadside unit (RSU), the V2X messages indicating a location of the RSU; utilize image sensors of the vehicle to capture sensor data of the RSU; and update a current position of the vehicle to a corrected current position of the vehicle based the RSU as shown in the sensor data and the location of the RSU indicated in the V2X messages.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Positioning accuracy plays a vital role in V2X applications. It may be desirable for V2X positioning to have accuracy on the order of 1.5 meters over 68% of the time. However, positioning accuracy in the urban canyons, tunnels, global navigation satellite system (GNSS) coverage areas may be degraded because of the non-line of sight satellites views, multipath effects, etc. Depending on high definition (HD) maps for positioning adjustment may incur a large cost for creating the map. Yet, lane-level positioning may remain unreliable in some areas.

An improved GNSS positioning approach is provided using V2X roadside unit (RSU) communications and vehicular sensors. As explained in further detail, the RSU may broadcast V2X MAP messages and RTCM messages which contains a location (latitude, longitude, elevation) of the RSU 114. When in the vicinity of the RSU 114, an onboard unit (OBU) of the vehicle receives the MAP and RTCM messages. Responsive to receipt of the messages, the OBU initiates the positioning enhancement algorithm and triggers vehicle sensors to capture imaging of the RSU. The sensors produce sensor data including the RSU. The OBU performs an X, Y, Z location conversion of the RSU with respect to the vehicle. A positioning enhancement algorithm receives the latitude, longitude, and elevation from the V2X messages from the RSU as well as the camera X, Y, Z inputs. Based on these inputs, the positioning enhancement algorithm outputs the vehicle position as latitude, longitude, and elevation. This improved positioning output may be used to correct the GNSS positioning errors of the vehicle.

Figure 1:
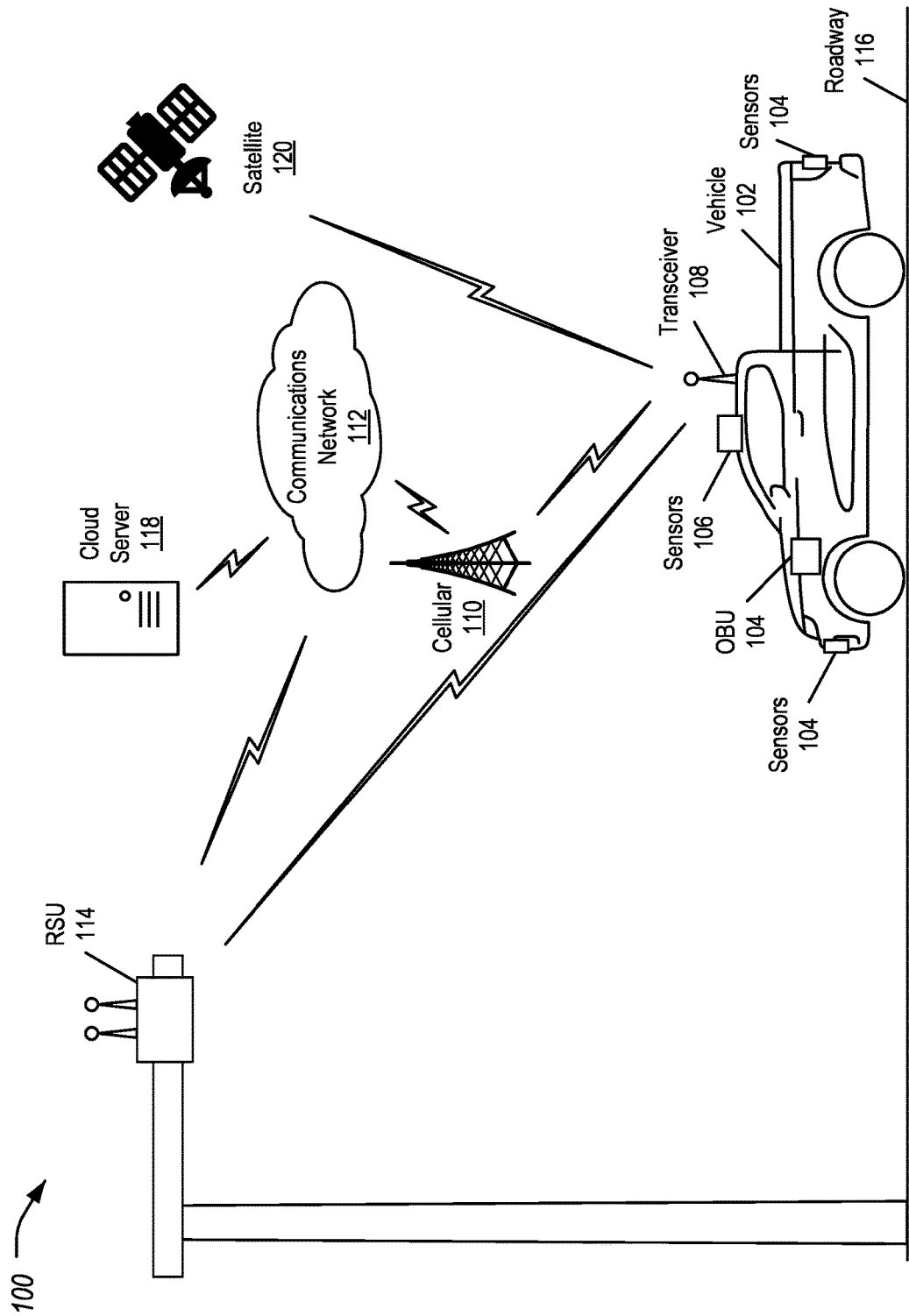
FIG. 1 illustrates an example system for improved GNSS positioning of vehicles.

FIG. 1 illustrates an example system 100 for improved GNSS positioning of vehicles 102. As shown, the system 100 includes a wireless-enabled vehicle 102 configured to travel along a roadway 116. The vehicle 102 includes an OBU 106 and a transceiver 108. The system 100 also includes a RSU 114. The RSU 114 communicates with the OBU 106 over a local connection and with a cloud server 118 over a communications network 112. Using the OBU 106, the vehicle 102 communicates with the RSU 114 via the communications network 112, e.g., via cellular network 110 and/or satellite 120 communications. It should be noted that the system 100 shown in FIG. 1 is merely an example, and systems having more, fewer, and different arrangements of elements may be used. For instance, one or more of the OBU 106, RSU 114, and cloud server 118, may be combined into a single device. Moreover, while one vehicle 102 along one roadway 116 is shown, it is contemplated that systems 100 would include many vehicles 102 and roadways 116 to traverse.

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The vehicles 102 may include one or more sensors 104. These sensors 104 may include, in some examples, cameras configured to capture visible light and/or infrared imagery surrounding the vehicle 102. In another example, the sensors 104 may include LIDAR and or RADAR sensors to supplement the camera imaging.

The OBU 106 may be configured to provide telematics services to the vehicle 102. These services may include, as some non-limiting possibilities, navigation, turn-by-turn directions, vehicle health reports, local business search, accident reporting, and hands-free calling. The OBU 106 may be in communication with a transceiver 108. The OBU 106 may accordingly be configured to utilize the transceiver 108 to communicate with a cellular network 110 over various protocols with a communications network 112 over a network protocol (such as Uu). The OBU 106 may, additionally, be configured to communicate over a broadcast peer-to-peer protocol (such as PC5), to facilitate V2X communications with devices such as the RSU 114. It should be noted that these protocols are merely examples, and different peer-to-peer and/or cellular technologies may be used.

The communications network 112 may provide communications services, such as packet-switched network services (e.g., Internet access, voice over Internet Protocol (VoIP) communication services), to devices connected to the communications network 112. An example of a communications network 112 is a cellular telephone network. For instance, the OBU 106 may access the cellular network via connection to one or more cellular towers. To facilitate the communications over the communications network 112, the OBU 106 may be associated with unique device identifiers (e.g., mobile device numbers (MDNs), Internet protocol (IP) addresses, etc.) to identify the communications of the OBU 106 on the communications network 112 as being associated with the vehicle 102.

The RSU 114 may be a device with processing capabilities and networking capabilities, and may be designed to be placed in proximity of a roadway 116 for use in communicating with vehicles 102. In an example, the RSU 114 may include hardware configured to communicate over the broadcast peer-to-peer protocol (such as PC5), to facilitate V2X communications with the vehicles 102. The RSU 114 may also have wired or wireless backhaul capability to allow for communication with other elements of the communications network 112, such as the cloud server 118.

For positioning purposes, the vehicle OBU 106 may additionally include global navigation satellite system (GNSS) functionality to provide autonomous geo-spatial positioning for the vehicle 102. As some examples, the GNSS functionality may allow the vehicle 102 to determine its position using one or more satellites 120, such as global positioning system (GPS), GLONASS, Galileo, Beidou and/or others.

Figure 2:
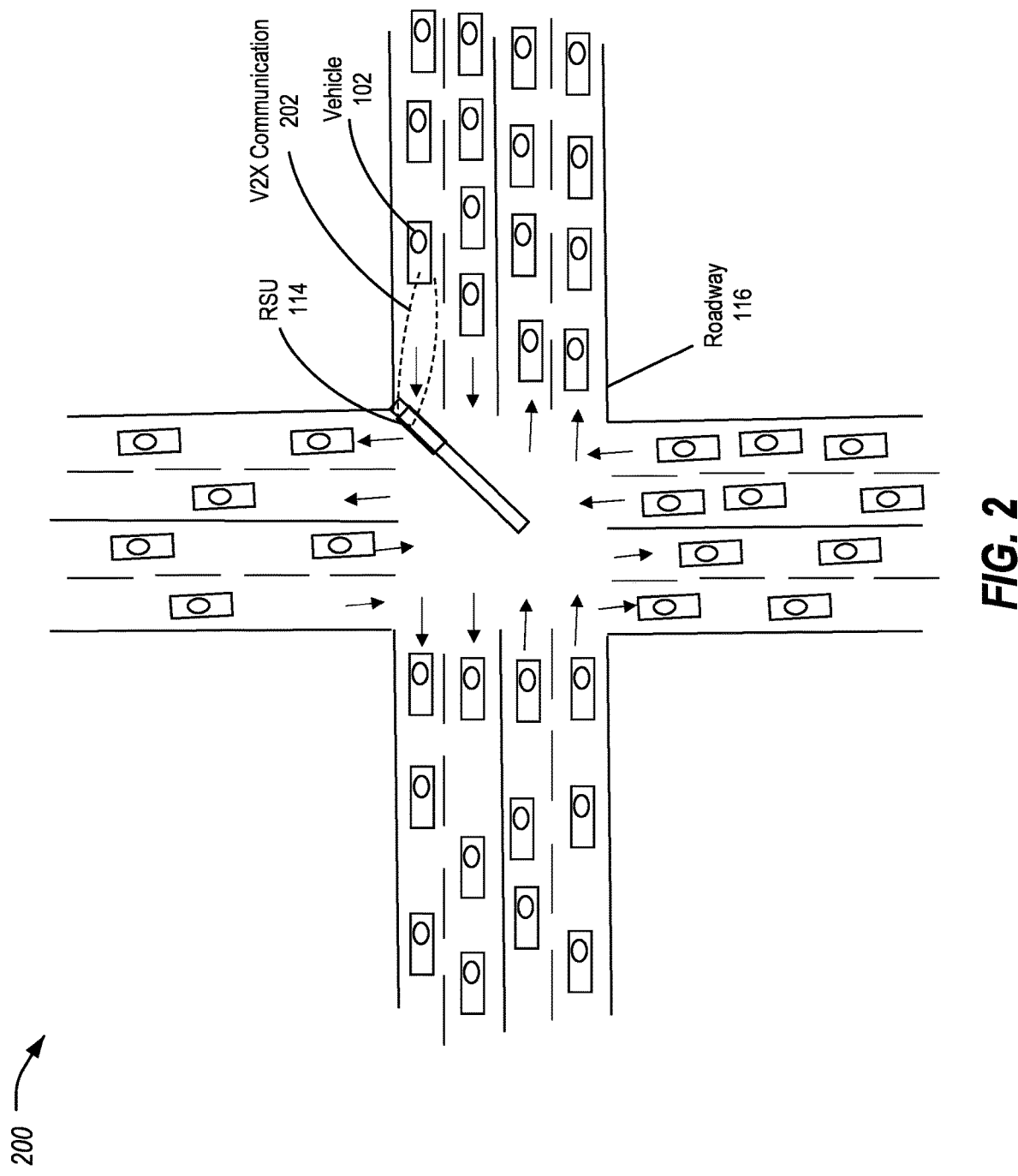
FIG. 2 illustrates an example overhead view of a congested intersection.

FIG. 2 illustrates an example overhead view 200 of a congested roadway 116. As shown, a vehicle 102 is in V2X communication 202 with the RSU 114. The vehicle 102 may also be within sensor 104 range of the RSU 114.

Figure 3:
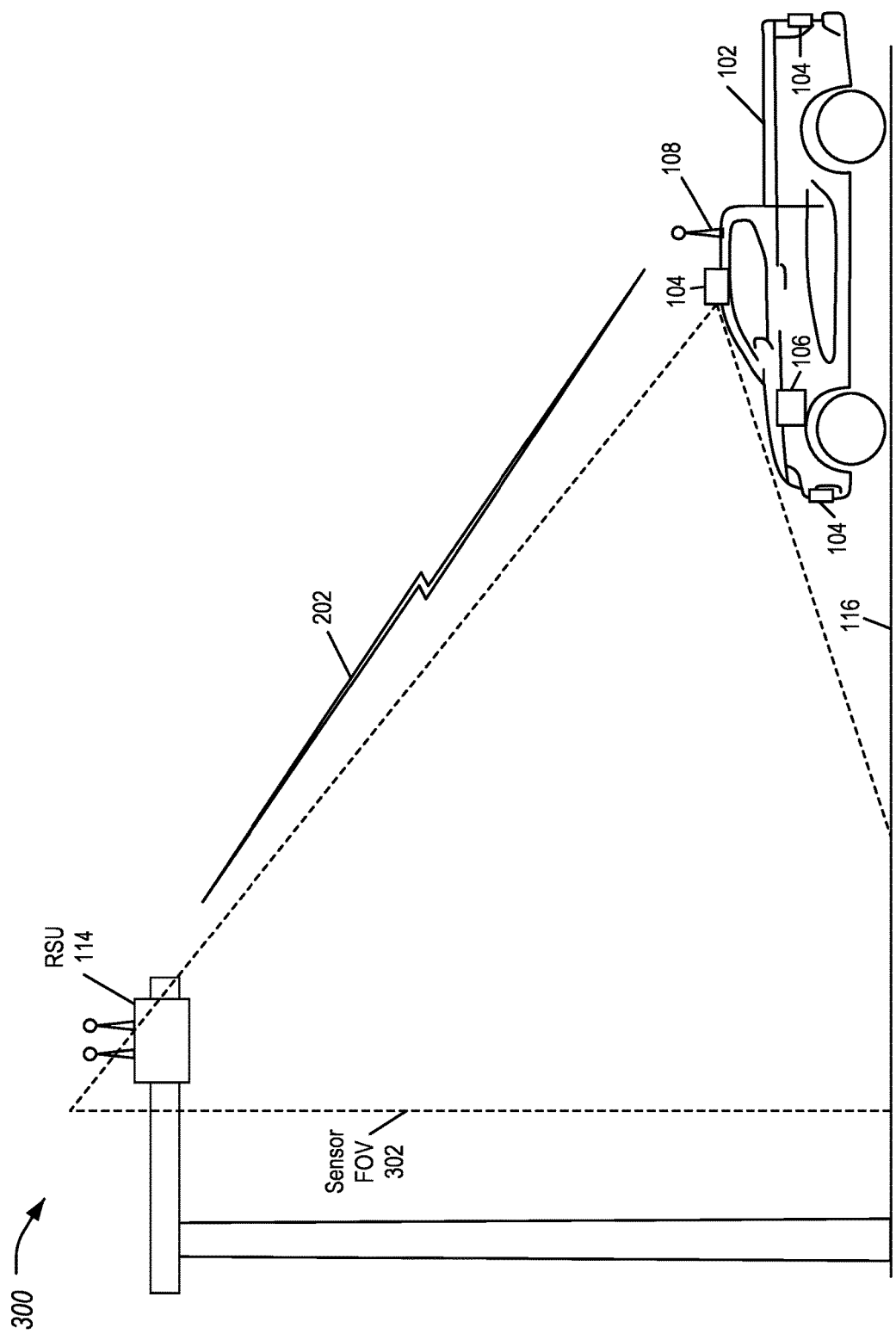
FIG. 3 illustrates an example diagram of the vehicle showing a field of view of the vehicle sensors.

FIG. 3 illustrates an example diagram 300 of the vehicle 102 showing a field of view (FOV) 302 of the vehicle sensors 104. As shown, the vehicle 102 is traversing the roadway 116 and is heading towards the RSU 114. The sensors 104 may accordingly be able to image the location of the RSU 114 as the RSU 114 comes into the FOV 302.

Figure 4:
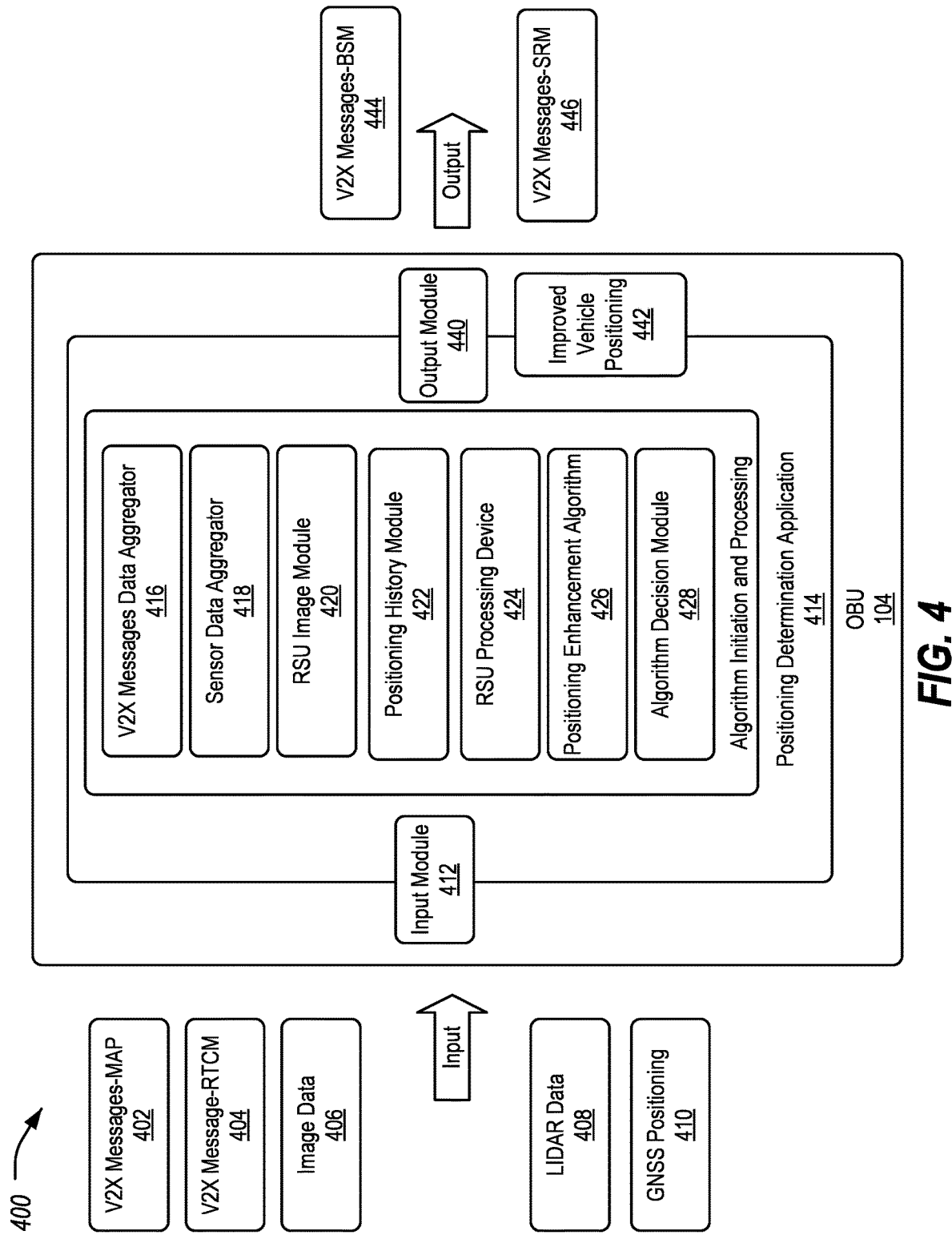
FIG. 4 illustrates example diagram of the data flow for the improved GNSS positioning of vehicles.

FIG. 4 illustrates example diagram 400 of the data flow for the improved GNSS positioning of vehicles 102. The OBU 106 of the vehicle 102 may receive V2X messages over the V2X communication 202. These messages may include MAP messages 402 which describe the geometric layout of the roadway 116, as well as RTCM messages 404 which describe details of the GNSS network. The OBU 106 may also receive sensor data (e.g., image data 406 and LIDAR data 408) from the sensors 104. The vehicle 102 may also receive GNSS positioning 410 via satellite 120. These data elements may be provided to an input module 412 of a positioning determination application 414 executed by the OBU 106.

A V2X messages data aggregator 416 of the positioning determination application 414 may be configured to aggregates the V2X messages received to the OBU 106. For example, this may include the MAP messages 402 as well as the RTCM messages 404 received via broadcasting from the RSU 114 over the V2X communication 202.

A sensor data aggregator 418 of the positioning determination application 414 may be configured to aggregate the image data 406 data information captured using the camera sensors 104, (along with a time-stamp when a trigger interrupt is received from the positioning enhancement algorithm 426). Responsive to receipt of a trigger interrupt, this sensor data aggregator 418 initiates the vehicle sensors 104 (e.g., a camera, LIDAR, etc.) to take a snapshot of the RSU 114 in line of sight (LOS) mode to avoid non-line-of-sight (NLOS) issues from the sensors 104. In an example, the snapshot may include a snapshot of the vehicle 102 surroundings including lane number, lane markers, width between markers, etc., and an image of the RSU 114 itself.

An RSU image module 420 of the positioning determination application 414 may be configured to include a neural network trained on the image data 406 of RSUs 114 as captured by the sensors 104 of the vehicle 102. Responsive to receiving the image data 406, the positioning determination application 414 performs image detection and classification using the trained algorithm. This trained algorithm also checks for occlusion of the image data 406 of RSUs 114. The trained algorithm also performs a conversion of the image data 406 of RSUs 114 to an X-Y-Z coordinate axis plane of the vehicle 102.

A positioning history module 422 of the positioning determination application 414 may be configured to track the positioning of past behavior of the vehicle 102 in volatile storage of the vehicle. This may include the maintenance of a history of positioning points at which vehicle GNSS degrades over the time, as well as a previous history path of the vehicle 102.

An RSU processing device 424 of the positioning determination application 414 may be configured to track of the positioning of vehicle's past behavior with volatile storage of the vehicle history positioning points whenever vehicle GPS degrades over the time and vehicle previous history path. This Module contains the algorithm to track of the positioning of vehicle's past behavior with volatile storage of the vehicle history positioning points whenever vehicle GPS degrades over the time and vehicle previous history path.

Figure 5:
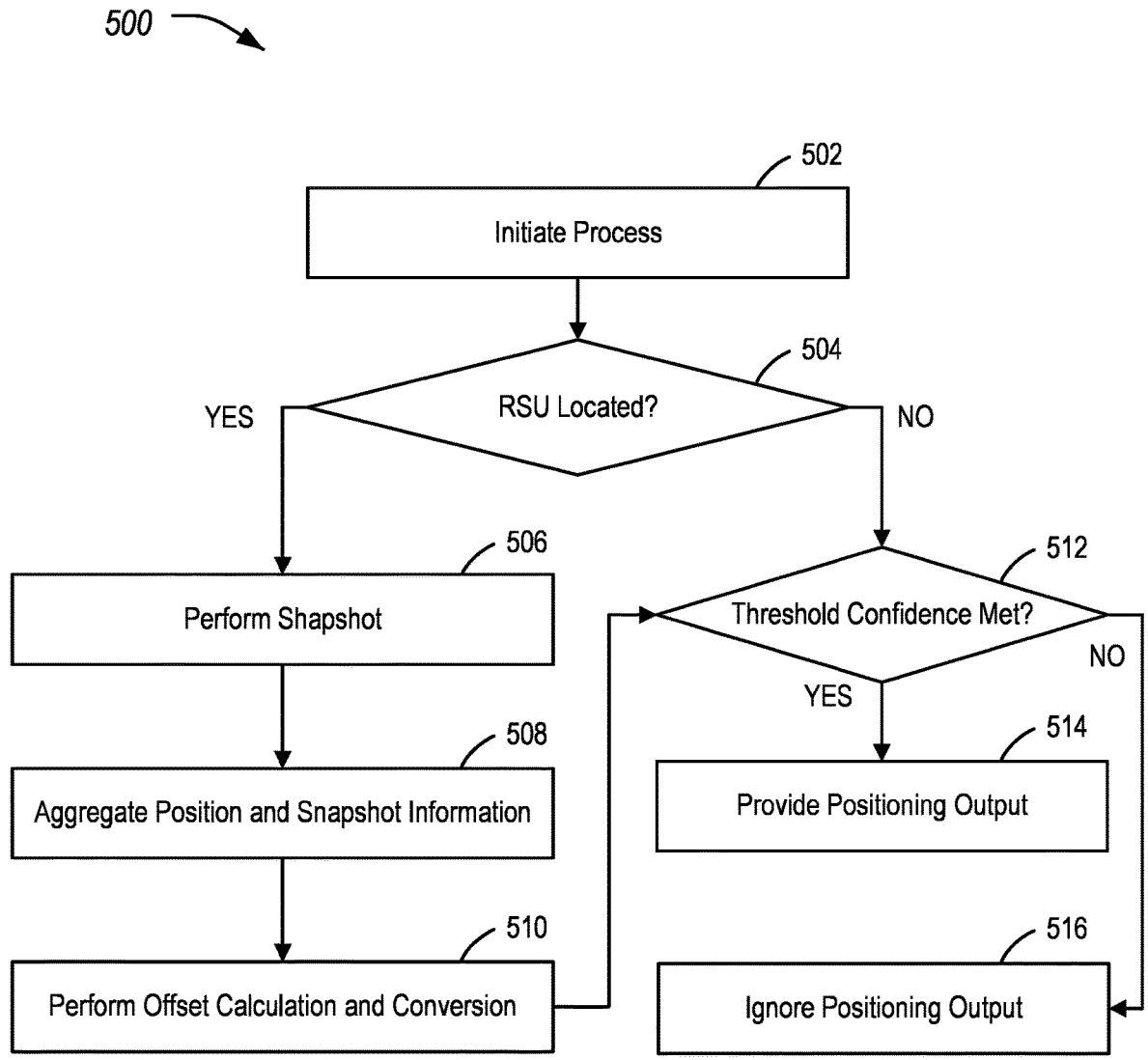
FIG. 5 illustrates an example process for performing positioning enhancement.

A positioning enhancement algorithm 426 of the positioning determination application 414 may be configured to perform a positioning enhancement process 500 as discussed in more detail with respect to FIG. 5.

Referring more specifically to FIG. 5, at operation 502 the OBU 106 initiates the positioning enhancement. This may occur, in an example, responsive to the vehicle 102 receiving the MAP messages 402 and the RTCM messages 404 over the V2X communication 202. This may occur as the vehicle 102 moves into communications range of the RSU 114.

In some cases, the triggering of the position enhancement may be initiated based on detection of sensor occlusion. For instance, a neural network of the RSU image module 420 trained on images of busy and uncongested roadways 116 may be used to determine whether to continue with the position enhancement. If vehicles 102 are detected in the image data 406 then the vehicle 102 may determine that sensor occlusion is occurring in which case position improvement may be desired.

In other cases, the triggering of the position enhancement may be initiated based on vehicle 102 heading. For instance, the OBU 106 may keep track of the heading of the vehicle 102 received from GNSS through the positioning history module 422. A heading match may be performed between the heading received from the positioning history module 422 and the heading indicated by received V2X messaging. If these differ by more than a threshold distance, then that may be a trigger that position enhancement should be utilized.

At operation 504, the OBU 106 determines vehicle 102 heading through a heading algorithm calculator and distance positioning using the MAP messages 402 received from the RSU 114 as well as the historical position information maintained by the positioning history module 422.

Figure 8:
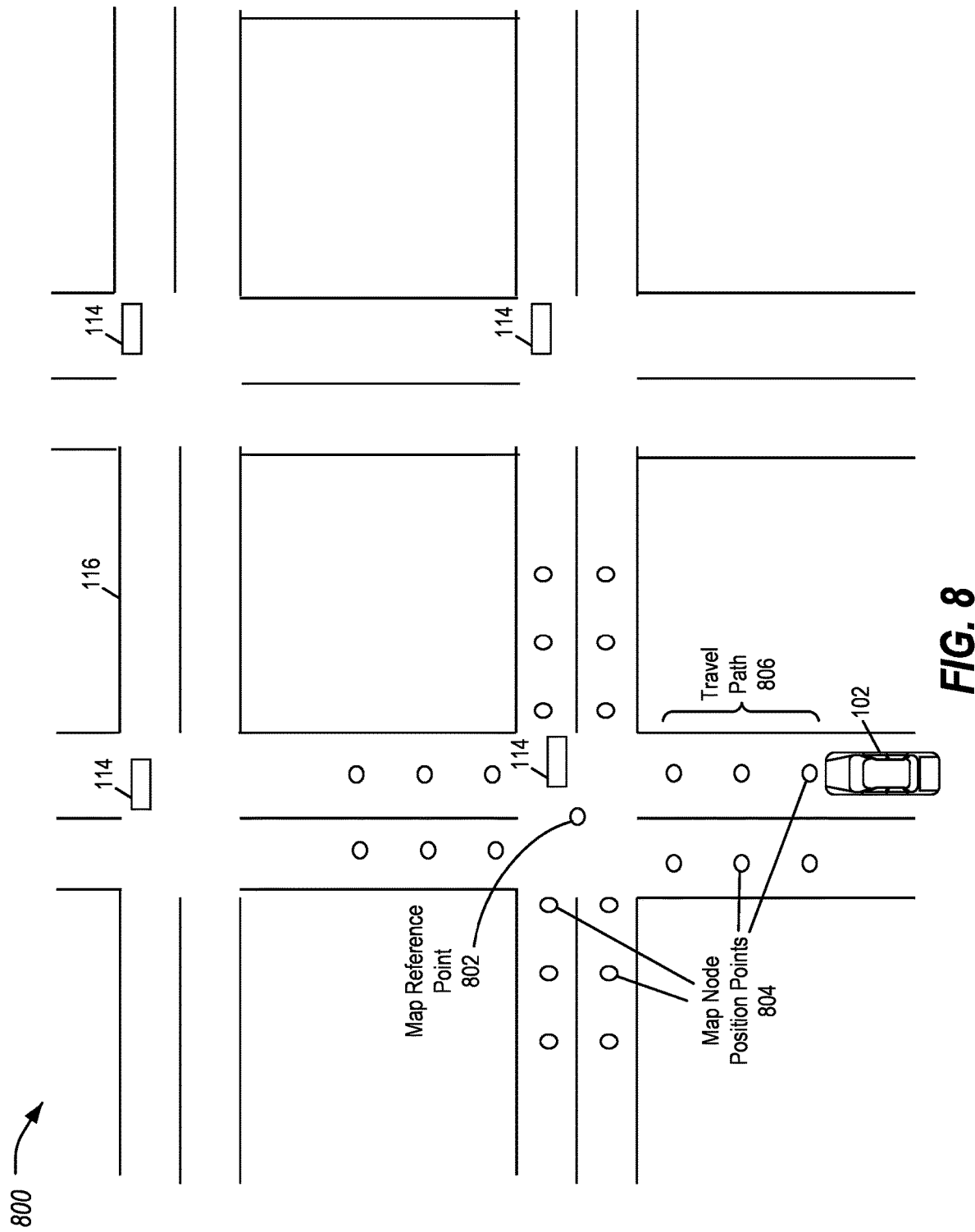
FIG. 8 illustrates an example of heading determination.

Referring to FIG. 8, an example 800 of heading determination is shown. In the example 800, a location of an intersection along the roadway 116 is indicated by a map reference point 802. Map node position points 804 indicative of defined locations along the roadway 116 are also shown. The map reference point 802 and map node position points 804 may be locations defined in the MAP messages 402 received to the vehicle 102. Additionally, a vehicle 102 traversing the roadway 116 is shown. Accordingly, a travel path 806 of the vehicle 102 may be inferred as being the map node position points 804 in a path in the travel direction of the vehicle 102. The travel direction and speed may be determined based on the historical position information. Thus, the current location of the vehicle 102 may be estimated as being one of the map node position points 804 along the travel direction of the vehicle 102 based on historical speed of the vehicle 102.

Referring back to FIG. 5, at operation 506 the OBU 106 performs a snapshot. In example, the OBU 106 initiates the interrupt trigger to the sensor data aggregator 418 and to the algorithm decision module 428. The sensor data aggregator 418 receives a snapshot of image data 406 and/or LIDAR data 408 and shares that data with the RSU image module 420.

At operation 508, the OBU 106 aggregates the position and snapshot information. In an example, the RSU image module 420 shares the X-Y-Z coordinate plane axis information of the RSU 114 with the positioning enhancement algorithm 426. The positioning enhancement algorithm 426 receives the X-Y-Z coordinate plane axis information from the RSU image module 420 and the X-Y-Z coordinate plane axis information from the RSU processing device 424 and compiles them into a complete snapshot of data with the snapshot.

At operation 510, the OBU 106 performs an offset calculation and conversion. In an example, the positioning enhancement algorithm 426 performs an offset calculation from the X-Y-Z coordinate axis plane of the vehicle 102 and derives a new X-Y-Z coordinate axis plane. The derived new X-Y-Z coordinate axis plane of the vehicle 102 is converted to a geo-coordinate frame (e.g., latitude, longitude, elevation). The derived latitude, longitude, elevation is output to the algorithm decision module 428. The offset may be computed based on the vehicle axis, e.g., where the vehicle sensors are (ex, cameras, lidars) placed or configured with respective vehicle dimensions (e.g., vehicle width, vehicle length, vehicle height). This may be done because sensor position may differ from the center of the vehicle 102 from which vehicle dimensions may be defined. The conversion is useful such that the vehicle sensors data of the RSU snapshot, RSU location from vehicle are in the same X-Y-Z coordinate plane axis for offset calculation.

At operation 512, the OBU 106 determines whether a threshold confidence is met. The confidence may default to 99% for example. If a physical RSU is present, then the confidence of RSU is for example 100%. If the RSU detection with the vehicle sensors (ex, camera, LIDAR, etc.) occurs, then the detection confidence is also high, e.g., 99-100%. This detection confidence may be provided after any occlusion problem is addressed. If the RSU location data is received over V2X, then the confidence may also be 100%. Based on these various multiple inputs, the confidence threshold is determined dynamically whether it is meeting the default threshold. In an example, based no confidence feedback the algorithm decision module 428 compares the derived latitude, longitude, and elevation of the vehicle 102 determines at operation 510 with an algorithm threshold. The confidence factor may be used to confirm that the derived positioning of vehicle 102 is actually on the roadway 116 where it should be not on the curb or off the roadway 116. If the derived latitude, longitude, and elevation meets the threshold confidence then the process 500 proceeds with sharing the derived positioning output to the algorithm output module 440 at operation 514. If not, control passes operation 516, to ignore the positioning output. After operations 514 or 516, the process 400 ends.

Figure 6:
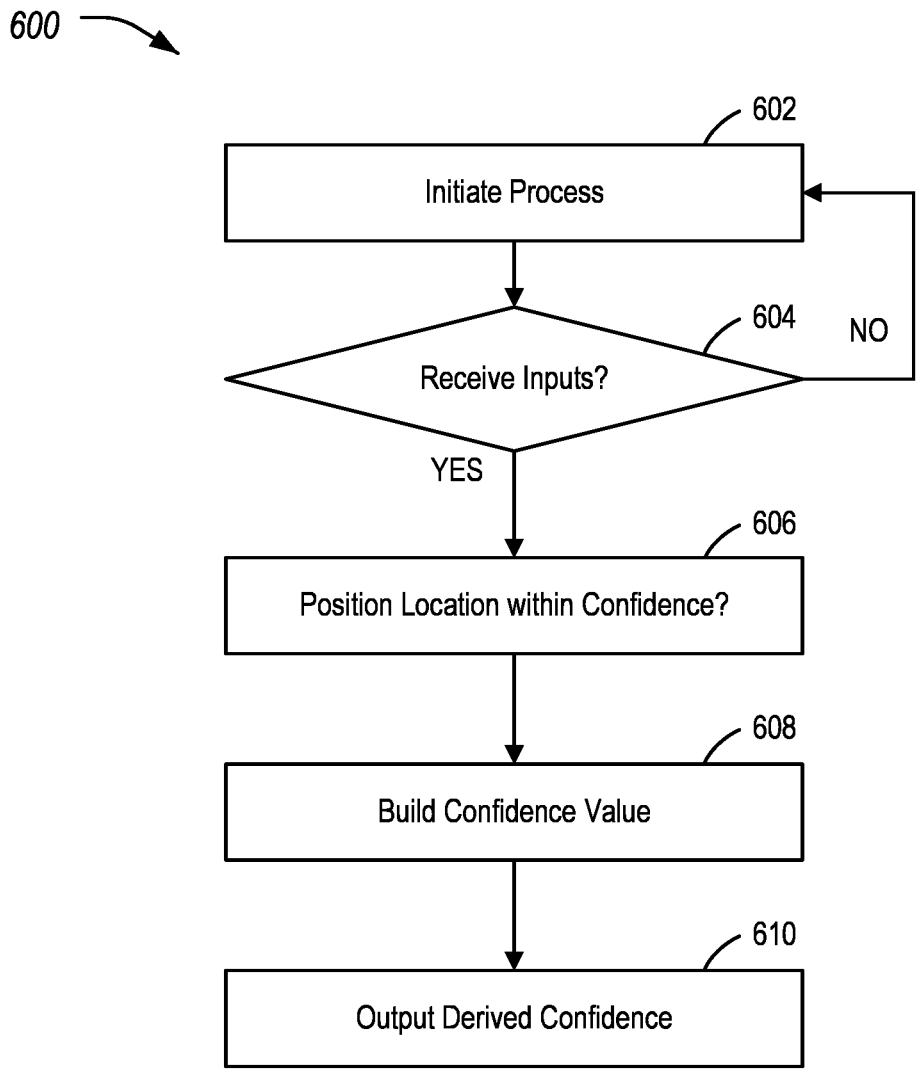
FIG. 6 illustrates an example process for performing an algorithm decision process.

Referring back to FIG. 4, an algorithm decision module 428 of the positioning determination application 414 may be configured to perform an algorithm decision process as discussed in more detail with respect to FIG. 6.

Referring more specifically to FIG. 6, at operation 602, the OBU 106 initiates the process 600. In an example, the algorithm decision module 428 may be initiated based on an interrupt trigger from the algorithm decision module 428.

At operation 604, the OBU 106 determines whether inputs are received. For example, the OBU 106 may wait for the output of the positioning enhancement algorithm 426 from operation 508 of the process 400. If such input is received, the process 600 continues to operation 606. Otherwise, the process 600 returns to operation 602 to continue waiting.

At operation 606, the OBU 106 determines whether a position location is within a confidence. For example, the positioning enhancement algorithm 426 initiates a computation algorithm to decide whether the computed confidence matches the threshold confidence for the positioning location outputted from the positioning enhancement algorithm 426. The confidence may be set to 99% as default threshold. The confidence may be specified based on the multiple factors, as noted with respect to operation 512.

At operation 608, the OBU 106 builds the confidence value. In an example, the algorithm module 428 builds a confidence number with respect to the vehicle 102 placement, utilizing factors such as lane details, lane markers 702, and width between lane markers 704 (as best shown in the illustration 700 of FIG. 7). These factors may be identified based on data received from the sensors 104, such as image data 406 from camera sensors and a match of the lane number received from processing of MAP messages 402.

At operation 610, the OBU 106 outputs the derived confidence. This derived confidence is output back to operation 512 as the threshold confidence. After operation 610 the process 600 ends.

Referring back to FIG. 4, the derived positioning output from operation 514 may be utilized as the improved vehicle positioning 442, thereby improving the accuracy of the GNSS location. This improved location may then be utilized in various messaging, such as BSM messages 444 and/or SRM messages 446.

Figure 7:
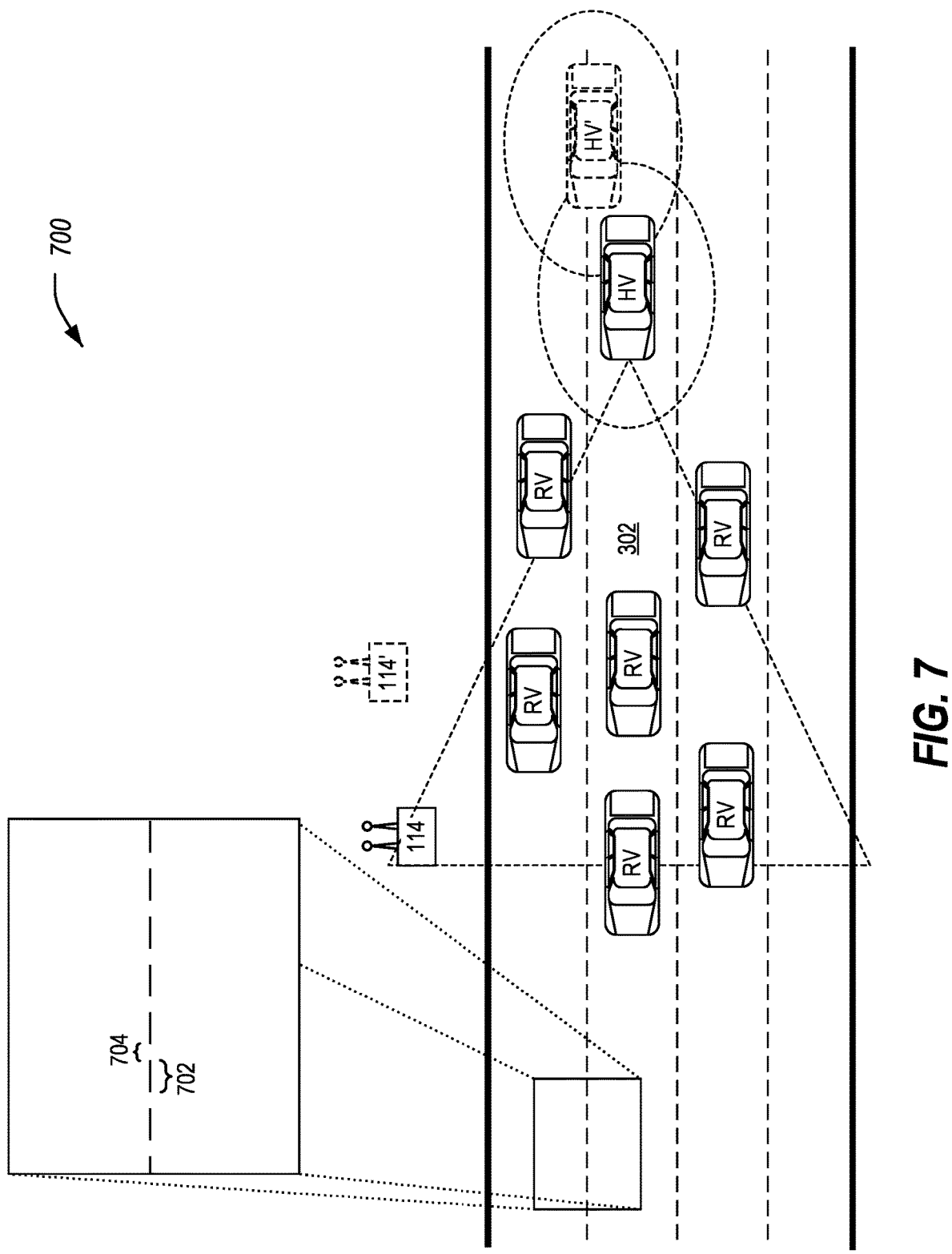
FIG. 7 illustrates an example of a host vehicle using the improved GNSS positioning of vehicles to determine its location.

As shown in FIG. 7, a host vehicle (HV) using the improved GNSS positioning of vehicles 102 may determine its location as shown. Based on the HV location, the vehicle 102 may interpret the coordinates of the RSU 114 as broadcast in the V2X messages to be as shown. However if the improved GNSS positioning of vehicles 102 is not used, then the HV may locate itself as shown at HV'. This difference in location may be in part due to the congestion on the roadway 116, which may result in occlusion of the signaling between the HV and RSU 114. Moreover, due to this difference in location, the HV' may interpret the location of the RSU 114 incorrectly as shown as RSU 114'. Thus, it can be seen that the offset calculation performed using the improved GNSS positioning may be used to correct the position of the vehicle 102.

Thus, as explained herein, the RSU 114 broadcasts MAP messages 402 and RTCM messages 404 which contain the location (e.g., latitude, longitude, elevation) of the RSU 114. When in the vicinity of the RSU 114, the OBU 106 of the vehicle 102 receives the MAP messages 402 and RTCM messages 404. Responsive to receipt of the messages 402, 404, the OBU 106 initiates the positioning enhancement algorithm and triggers the vehicle sensor 104 to capture imaging of the RSU 114. The OBU 106 performs an X, Y, Z location conversion of the RSU 114 with respect to the vehicle 102. The positioning enhancement algorithm 436 receives the latitude, longitude, and elevation from the V2X messages 402, 404 from the RSU 114 as well as the camera X, Y, Z inputs. Based on these inputs, the positioning enhancement algorithm 436 outputs the vehicle position as latitude, longitude, and elevation. This improved positioning output may be used to correct the GNSS positioning errors of the vehicle 102.

Figure 9:
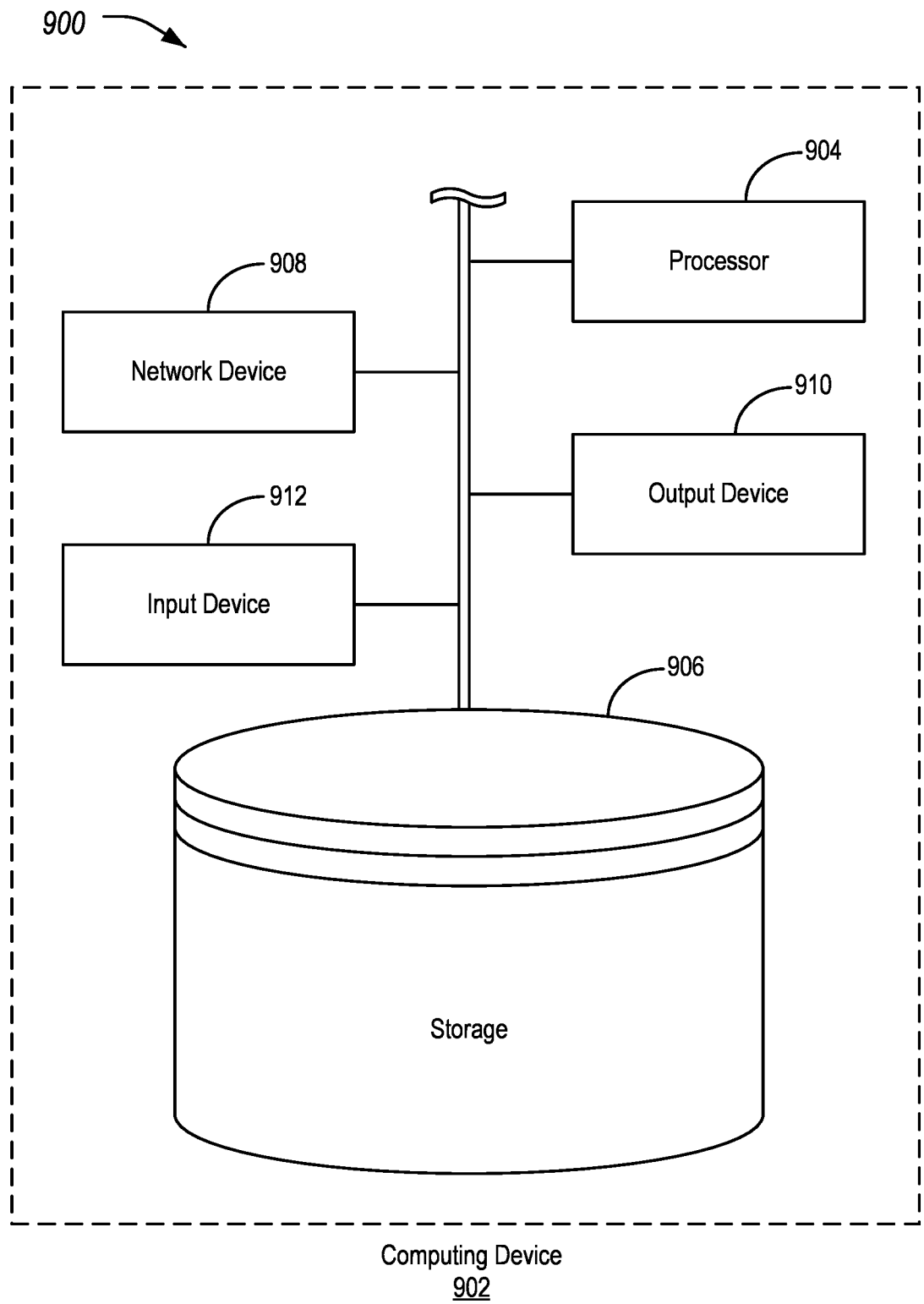
FIG. 9 illustrates an example of a computing device for use in the improved GNSS positioning of vehicles.

FIG. 9 illustrates an example 900 of a computing device 902 for use in the improved GNSS positioning of vehicles 102. Referring to FIG. 9, and with reference to FIGS. 1-8, the OBU 106, RSU 114, and cloud server 118, may be examples of such computing devices 902. As shown, the computing device 902 may include a processor 904 that is operatively connected to a storage 906, a network device 908, an output device 910, and an input device 912. It should be noted that this is merely an example, and computing devices 902 with more, fewer, or different components may be used.

The processor 904 may include one or more integrated circuits that implement the functionality of a central processing unit (CPU) and/or graphics processing unit (GPU). In some examples, the processors 904 are a system on a chip (SoC) that integrates the functionality of the CPU and GPU. The SoC may optionally include other components such as, for example, the storage 906 and the network device 908 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 904 executes stored program instructions that are retrieved from the storage 906. The stored program instructions, accordingly, include software that controls the operation of the processors 904 to perform the operations described herein. The storage 906 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 910. The output device 910 may include a graphical or visual display device, such as an electronic display screen, projector, printer, or any other suitable device that reproduces a graphical display. As another example, the output device 910 may include an audio device, such as a loudspeaker or headphone. As yet a further example, the output device 910 may include a tactile device, such as a mechanically raisable device that may, in an example, be configured to display braille or another physical output that may be touched to provide information to a user.

The input device 912 may include any of various devices that enable the computing device 902 to receive control input from users. Examples of suitable input devices that receive human interface inputs may include keyboards, mice, trackballs, touchscreens, voice input devices, graphics tablets, and the like.

The network devices 908 may each include any of various devices that enable the OBU 106, RSU 114, and/or cloud server 118, to send and/or receive data from external devices over networks (such as the communications network 112). Examples of suitable network devices 908 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for performing vehicle positioning, comprising:
   a transceiver;
   sensors; and
   an onboard unit (OBU), programmed perform a position enhancement including to
   track a first heading of a vehicle received via a global navigation satellite system (GNSS);
   receive, via the transceiver, vehicle-to-everything (V2X) messages from a roadside unit (RSU), the V2X messages indicating a location of the RSU,
   track a second heading of the vehicle according to the V2X messages;
   perform a heading match between the first heading and the second heading; and
   triggering performing the position enhancement to determine a corrected current position of the vehicle responsive to the headings differing by at least a threshold amount, the position enhancement including to:
   utilize the sensors to capture sensor data of the RSU, and
   update a current position of the vehicle to be the corrected current position of the vehicle based on the RSU as shown in the sensor data and the location of the RSU indicated in the V2X messages.

2. The vehicle of claim 1, wherein the sensors include image sensors, and the sensor data includes image data.

3. The vehicle of claim 1, wherein the sensors include LIDAR sensors, and the sensor data includes LIDAR data.

4. The vehicle of claim 1, wherein the OBU is further programmed to:
   determine an offset between the current position of the vehicle and a position of the vehicle indicated by the V2X messages and sensor data; and
   utilize the offset to adjust the current position of the vehicle to the corrected current position of the vehicle responsive to the corrected current position being within a threshold confidence.

5. The vehicle of claim 1, wherein the OBU is further programmed to trigger the position enhancement responsive to the OBU detecting sensor occlusion based on data received from the sensors.

6. The vehicle of claim 1, wherein the OBU is further programmed to:
   maintain a position history of the vehicle; and
   trigger the position enhancement responsive to the current position of the vehicle failing to match the position history of the vehicle.

7. The vehicle of claim 1, wherein the OBU is further programmed to send V2X messages using the transceiver, the sent V2X messages including the corrected current position of the vehicle.

8. A method for performing vehicle heading analysis and position enhancement for vehicle positioning, comprising:
   tracking a first heading of a vehicle received via a global navigation satellite system (GNSS);
   receiving, to an onboard unit (OBU) of a vehicle via a transceiver of the vehicle, vehicle-to-everything (V2X) messages from a roadside unit (RSU), the V2X messages indicating a location of the RSU;
   tracking a second heading of the vehicle according to the V2X messages;
   performing a heading match between the first heading and the second heading; and
   triggering performing position enhancement to determine the corrected current position of the vehicle responsive to the headings differing by at least a threshold amount, the position enhancement including:
   utilizing sensors of the vehicle to capture sensor data of the RSU; and
   updating a current position of the vehicle to a corrected current position of the vehicle based on the RSU as shown in the sensor data and the location of the RSU indicated in the V2X messages.

9. The method of claim 8, further comprising:
   determining an offset between the current position of the vehicle and a position of the vehicle indicated by the V2X messages and sensor data; and utilizing the offset to adjust the current position of the vehicle to the corrected current position of the vehicle responsive to the corrected current position being within a threshold confidence.

10. The method of claim 9, wherein the threshold confidence includes confirming that the corrected current position is along a roadway as defined by map data included in the V2X messages.

11. The method of claim 8, further comprising triggering the position enhancement responsive to the OBU detecting sensor occlusion based on data received from the sensors.

12. The method of claim 8, further comprising:
maintaining a position history of the vehicle; and
triggering the position enhancement responsive to the current position of the vehicle failing to match the position history of the vehicle.

13. The method of claim 8, further comprising sending V2X messages using the transceiver, the sent V2X messages including the corrected current position of the vehicle.

14. A non-transitory computer-readable medium comprising instructions for performing position enhancement for vehicle positioning, that, when executed by a processor of an onboard unit (OBU) of a vehicle cause the OBU to perform operations comprising to:
track a first heading of a vehicle received via a global navigation satellite system (GNSS);
receive, to the OBU via a transceiver of the vehicle, vehicle-to-everything (V2X) messages from a roadside unit (RSU), the V2X messages indicating a location of the RSU;
track a second heading of the vehicle according to the V2X messages;
perform a heading match between the first heading and the second heading; and
trigger performing position enhancement to determine the corrected current position of the vehicle responsive to the headings differing by at least a threshold amount, the position enhancement including to:
utilize image sensors of the vehicle to capture sensor data of the RSU;
determine a current position of the vehicle to a corrected current position of the vehicle based on the RSU as shown in the sensor data and the location of the RSU indicated in the V2X messages;
confirm that the corrected current position is along a roadway as defined by map data included in the V2X messages; and
update the current position to be the corrected current position responsive to the corrected current position being along the roadway.

15. The medium of claim 14, further comprising instructions that when executed by the OBU, cause the OBU to perform operations comprising to:
determine an offset between the current position of the vehicle and a position of the vehicle indicated by the V2X messages and sensor data; and
utilize the offset to adjust the current position of the vehicle to the corrected current position of the vehicle responsive to the corrected current position being within a threshold confidence.

16. The medium of claim 14, further comprising instructions that when executed by the OBU, cause the OBU to perform operations comprising to trigger the position enhancement responsive to the OBU detecting sensor occlusion based on data received from the image sensors.

17. The medium of claim 14, further comprising instructions that when executed by the OBU, cause the OBU to perform operations comprising to:
maintain a position history of the vehicle; and
trigger the position enhancement responsive to the current position of the vehicle failing to match the position history of the vehicle.

18. The medium of claim 14, further comprising instructions that when executed by the OBU, cause the OBU to perform operations comprising to send V2X messages using the transceiver, the sent V2X messages including the corrected current position of the vehicle.

* * * * *